United States Patent [19]

Azuma

[11] Patent Number: 4,765,862

[45] Date of Patent: Aug. 23, 1988

[54] APPARATUS FOR JOINING THE ENDS OF BELT-SHAPED MATERIALS

[75] Inventor: Toshio Azuma, Tokyo, Japan

[73] Assignee: Bridgestone Corporation, Tokyo, Japan

[21] Appl. No.: 14,319

[22] Filed: Feb. 13, 1987

[30] Foreign Application Priority Data

Feb. 13, 1986 [JP] Japan .................................. 61-29378

[51] Int. Cl.$^4$ ........................ B32B 31/20; B65H 69/06
[52] U.S. Cl. .................................. 156/507; 156/304.1; 156/502
[58] Field of Search ............ 156/502, 507, 157, 304.1, 156/421

[56] References Cited

U.S. PATENT DOCUMENTS

| | | | |
|---|---|---|---|
| 2,956,615 | 10/1960 | Hasselquist | 156/502 |
| 3,325,328 | 6/1967 | Henley | 156/502 |
| 3,433,690 | 3/1969 | Barns | 156/502 |
| 4,246,063 | 1/1981 | Grönebaum | 156/304.1 |

FOREIGN PATENT DOCUMENTS

| | | | |
|---|---|---|---|
| 610544 | 12/1960 | Canada | 156/507 |
| 51-59980 | 5/1976 | Japan . | |
| 59-145128 | 8/1984 | Japan . | |

Primary Examiner—Michael Wityshyn
Attorney, Agent, or Firm—Sughrue, Mion, Zinn, Macpeak, and Seas

[57] ABSTRACT

In an apparatus for joining the ends of belt-shaped materials which comprises a front end lower pawl and a front end upper pawl which are driven to hold the front end portion of a first belt-shaped material and a rear end lower pawl and a rear end upper pawl which are driven to hold the rear end portion of a second belt-shaped material, so as to butt-join the front end of the first belt-shaped material and the rear end of the second belt-shaped material. The rear end lower pawl and the rear end upper pawl have rear end protrusions arranged like the teeth of a comb and which protrude towards the front end lower pawl and the front end upper pawl, respectively. The front end lower pawl and the front end upper pawl also have front end protrusions arranged like the teeth of a comb and which protrude towards the rear end lower pawl and the rear end upper pawl, respectively. As a result, when the rear end lower pawl and rear end upper pawl and the front end lower pawl and the front end upper pawl are moved towards each other, the front end protrusions and the rear end protrusions are intertwined with each other, thus providing planar surfaces to support the junction of the belt-shaped materials.

4 Claims, 6 Drawing Sheets

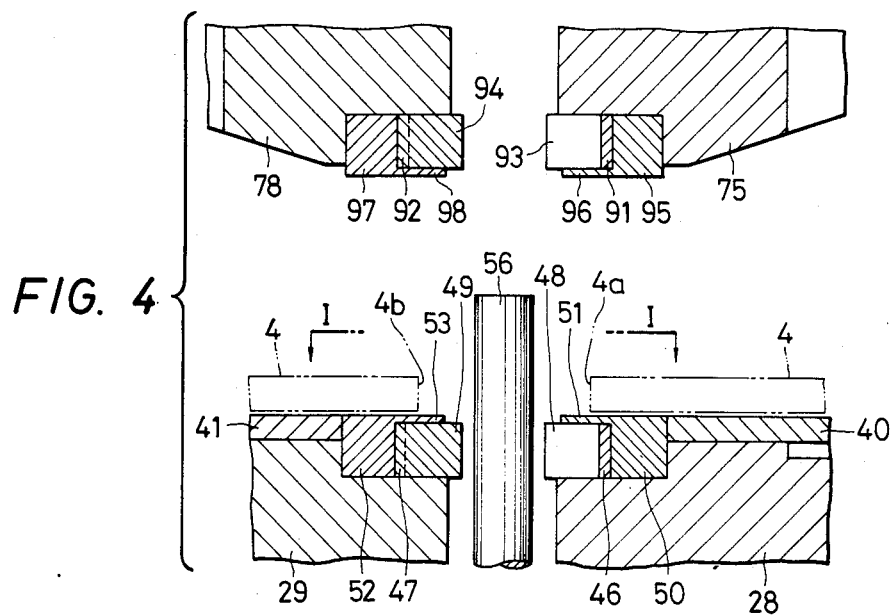
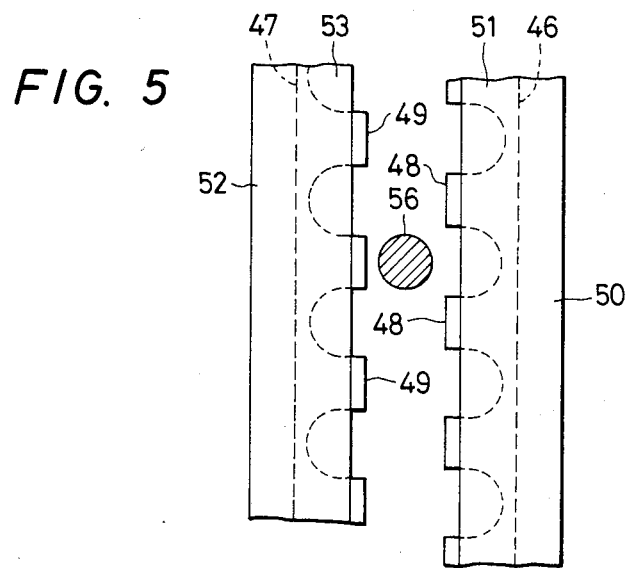
FIG. 4
FIG. 5

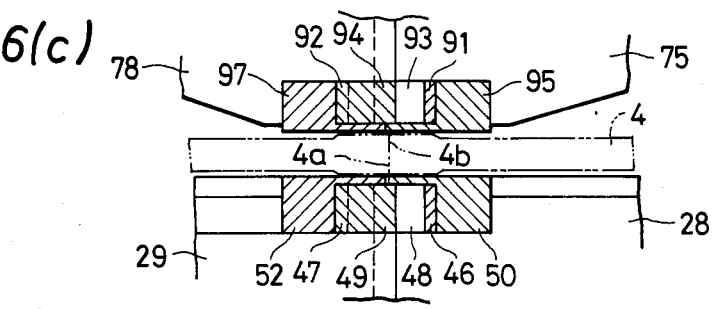
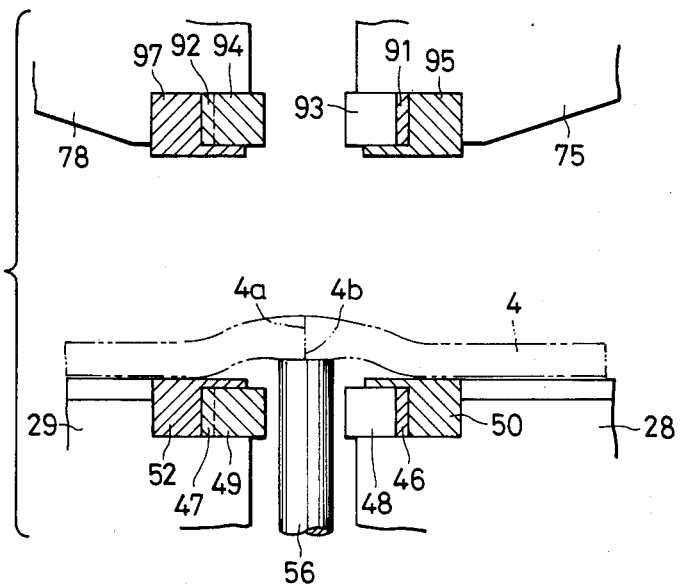

APPARATUS FOR JOINING THE ENDS OF BELT-SHAPED MATERIALS

BACKGROUND OF THE INVENTION

1. Field of the Invention

This invention relates to an apparatus for joining the ends of belt-shaped materials such as rubber-covered cord layers to form pneumatic tires.

2. Background of the Invention

In the tire industry, carcass plies are manufactured as follows. A number of cords laid in parallel are coated with rubber to form a rubber-covered cord layer. The rubber-covered cord layer thus formed is cut at equal intervals at a predetermined angle from its longitudinal direction to provide belt-shaped materials. The belt-shaped materials thus provided are butt-joined through their side edges which are in parallel with the cords.

One example of a conventional apparatus used for practicing the above-described belt-shaped material joining method has been disclosed, for instance, by Japanese Patent Application (OPI) No. 59980/1976 (the term "OPI" as used herein meaning "an unexamined published application"). The apparatus comprises a positioning plate which is caused to go in and out of the gap between the front end of a first belt-shaped material and the rear end of a second belt-shaped material and against which the front end and the rear end are abutted so that the front end and the rear end are made substantially parallel with each other. A pair of lower depressing members extend respectively along the front end of the first belt-shaped material and the rear end of the second belt-shaped material. Retaining plates are provided immediately above and in parallel with the lower depressing members, respectively. Air cylinders move the retaining plates downwardly so that the front end portion of the first belt-shaped material and the rear end portion of the second belt-shaped material are held between the retaining plates and the depressing members, respectively. Another air cylinder moves the lower depressing member for the first belt-shaped material and the retaining plate engaged with the depressing member towards the other lower depressing member, thereby to allow the butt-joining of the front end of the first belt-shaped material and the rear end of the second belt-shaped material. The apparatus can uniformly and positively butt-join belt-shaped materials even if the front and rear ends thereof are not straight.

However, the conventional apparatus is still disadvantageous in the following point. In the apparatus, the confronting surfaces of the retaining plates and the lower depressing members are linear. Therefore, the front end portion of the first belt-shaped material and the rear end portion of the second belt-shaped material which have come out of the confronting surfaces as much as predetermine values are set free during butt-joining. Accordingly, if the front end portion and the rear end portion have been deformed, they are buckled, as a result of which the front end of the first belt-shaped material and the rear end of the second belt-shaped material are partially butt-joined in an unsatisfactory way.

SUMMARY OF THE INVENTION

Accordingly, an object of this invention is to eliminate the above-described difficulty accompanying a conventional apparatus for joining the ends of belt-shaped materials.

The foregoing object and other objects of the invention have been achieved by the provision of an apparatus for joining the ends of belt-shaped materials comprising a front end lower pawl and a rear end lower pawl which are extended respectively along the front end of a first belt-shaped material and the rear end of a second belt-shaped material. A front end upper pawl and a rear end upper pawl are provided immediately above and in parallel with the front end lower pawl and the rear end lower pawl, respectively. Drive means move the front end lower pawl and the front end upper pawl towards each other to hold the front end portion of the first belt-shaped material therebetween and to hold the rear end lower pawl and the rear end upper pawl towards each other to thereby hold the rear end portion of the second belt-shaped material therebetween. The drive means also moves the rear end lower and upper pawls and the front end lower and upper pawls towards each other so that the front end of the first belt-shaped material and the rear end of the second belt-shaped material are butt-joined. According to the invention, the rear end lower pawl and the rear end upper pawl have rear end protrusions which are arranged at intervals in their longitudinal direction and they protrude towards the front end lower pawl and the front end upper pawl, respectively. The front end lower pawl and the front end upper pawl have front end protrusions which are arranged at intervals in their longitudinal direction and protrude towards the rear end lower pawl and the rear end upper pawl, respectively. The front end protrusions are intertwined with the rear end protrusions when the rear end lower pawl and rear end upper pawl and the front end lower pawl and front end upper pawl are moved towards each other.

In the apparatus, the rear end lower pawl and the rear end upper pawl are moved towards each other to hold the rear end portion of the second belt-shaped material. Similarly, the front end lower pawl and the front end upper pawl are moved towards each other to hold the front end portion of the first belt-shaped material which is substantially in parallel with the rear end portion of the second belt-shaped material. As a result, the wavy deformation if any of the front and/or rear end portion is corrected. That is, the front end portion and the rear end portion are made flat. Under this condition, the rear end lower pawl and the rear end upper pawl holding the rear end portion of the second belt-shaped material, and the front end lower pawl and the front end upper pawl holding the front end portion of the first belt-shaped material are moved towards each other, so as to butt-join the front end of the first belt-shaped material and the rear end of the second belt-shaped material. In this operation, the rear end protrusions provided for the rear end upper pawl and the rear end lower pawl, and the front end protrusions provided for the front end upper pawl and the front end lower pawl are intertwined with each other, thus providing planar surfaces above and below the junction of the belt-shaped materials which have substantially no gaps therein. Therefore, the junction of the belt-shaped material, being held by the rear end protrusions and the front end protrusions, has increased butt-joining pressure. Furthermore, even if the front end portion of the first belt-shaped material and the rear end portion of the second belt-shaped material have been partially deformed, those parts are prevented from buckling deformation, and the belt-shaped materials are uniformly and positively joined together.

The nature, principle and utility of the invention will become more apparent from the following detailed description when read in conjunction with the accompanying drawings, in which like parts are designated by like reference numerals or characters.

BRIEF DESCRIPTION OF THE INVENTION

In the accompanying drawings:

FIG. 4 is a sectional front view showing a front end lower pawl, a front end upper pawl, a rear end lower pawl and a rear end upper pawl in the apparatus of the invention.

FIG. 5 is a sectional view taken along line I—I in FIG. 4.

FIGS. 6(a) to 6(d) are explanatory diagrams for a description of the operation of the apparatus according to the invention.

DETAILED DESCRIPTION OF THE PREFERRED INVENTION

One example of an apparatus for joining the ends of belt-shaped materials according to this invention will be described with reference to the accompanying drawings.

Figure 2:
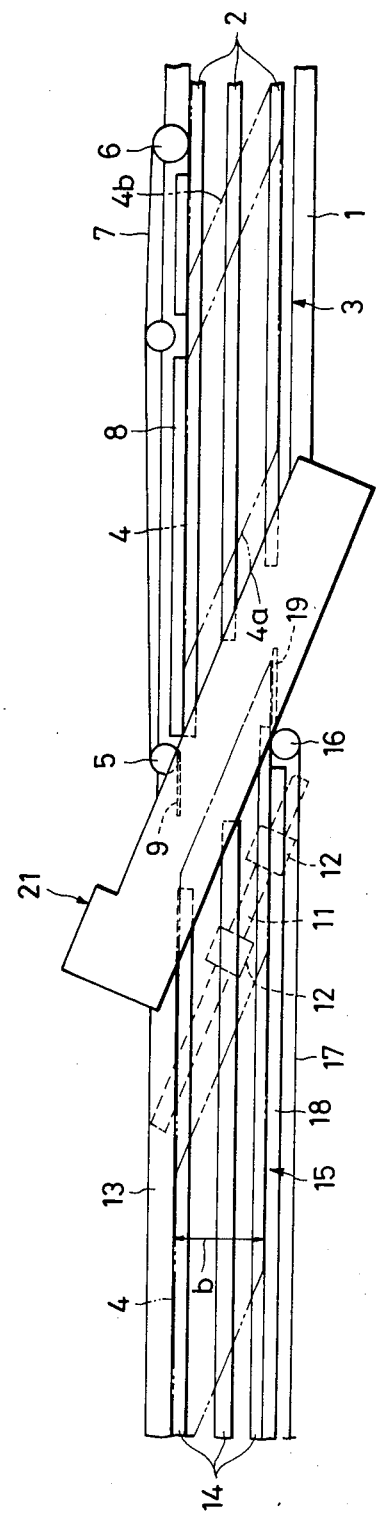
FIG. 2 is a plan view outlining the entire arrangement of the apparatus according to the invention.

In FIG. 2, conveyor frame 1 supports a first conveyor 3 comprising a plurality of belts 2. Belt-shaped materials 4 are loaded on the first conveyor 3. The belt-shaped materials 4 are formed as follows. A number of steel cords laid in parallel are coated with rubber to form a rubber-covered cord layer. The rubber-covered cord layer thus formed is cut at equal intervals at a predetermined angle with respect to the longitudinal direction of the cord layer to provide the belt-shaped materials 4. Each of the belt-shaped materials 4 is laid on the first conveyor 3 in such a manner that the cords form the predetermined angle with the direction of conveyance of the first conveyor 3. Accordingly, the front end 4a and the rear end 4b of each of the belt-shaped materials 4 on the first conveyor 3 are the two side edges of the rubber-covered cord layer. The straight line connecting the downstream ends of the belts 2 is in parallel with the front end 4a of the belt-shaped material.

The conveyor frame 1 has a correcting belt 7 laid over a pair of rollers 5 and 6 in such a manner that the correcting belt 7 is in parallel with the belts 2. A magnet 8 is provided inside the correcting belt 7 in such a manner that it extends along the correcting belt 7. The magnet 8 is used to attract the steel cords in the belt-shaped material 4 to cause the side edge of the belt-shaped material 4 to contact the correcting belt 7 thereby to correct the alignment of the belt-shaped material during conveyance.

Downstream of the first conveyor 3, a plurality of rails 11 are provided on the conveyor frame 1 in such a manner that they are in parallel with the front end 4a of the belt-shaped material 4. The rails 11 support a movable frame 13 which is moved through sliders 12 by moving means (not shown). The movable frame 13 supports a second conveyor 15 comprising a plurality to belts 14. The second conveyor 15 is in parallel with the first conveyor 3 and flush with the first conveyor 3. The straight line connecting the upstream ends of the belts 14 is in parallel with the front end 4a of the belt-shaped material 4.

The movable frame 13 has a correcting belt 17 on the side of the second conveyor 15 which is laid on rollers 16. A magnet 18 is provided within the correcting belt 17 in such a manner that it extends along the correcting belt 17. Similarly as in the case of the above-described magnet 8, the magnet 18 operates to correct the alignment of the belt-shaped material 4 during conveyance.

The belt-shaped material 4 is guided by guide plates 9 and 19.

Figure 1:
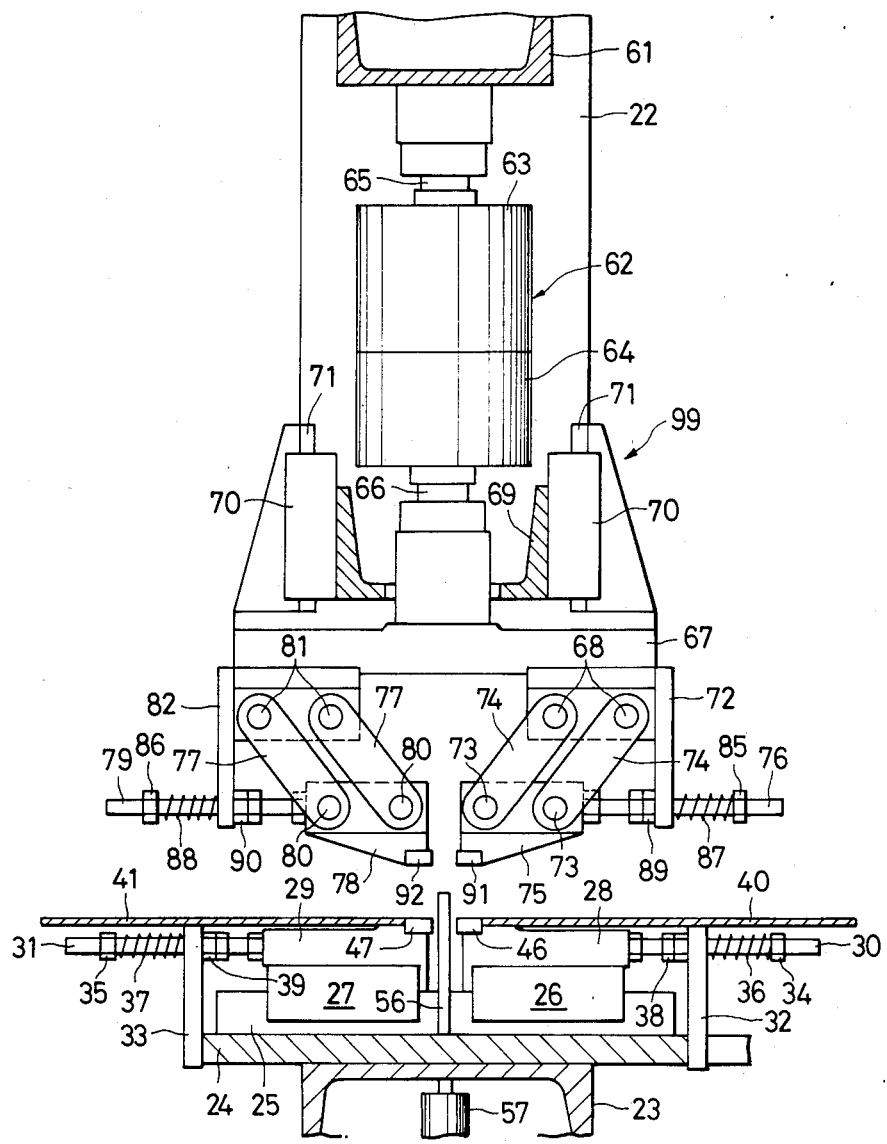
FIG. 1 is a front view, with parts cut away, showing one example of an apparatus for joining the ends of belt-shaped materials according to this invention.
Figure 3:
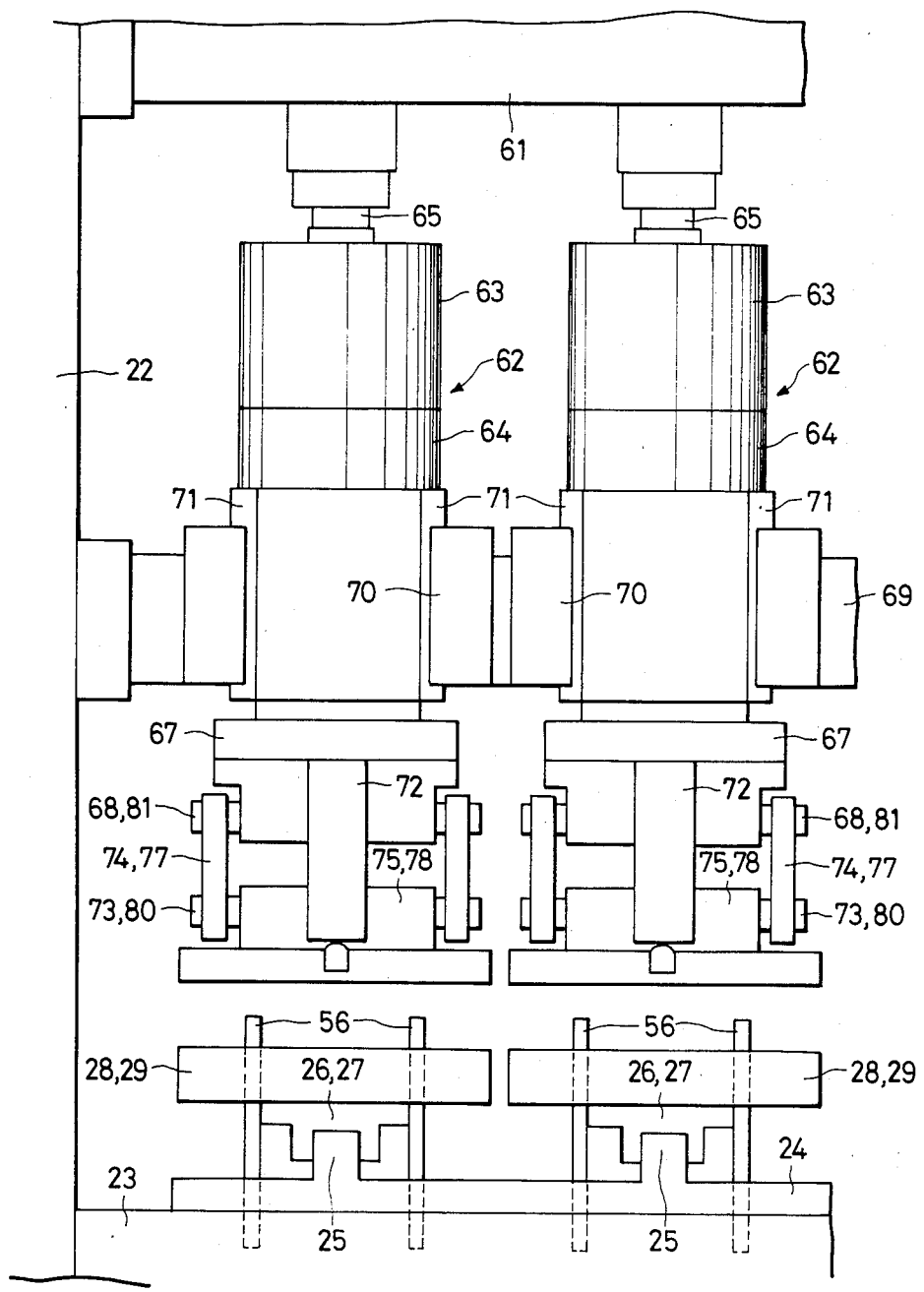
FIG. 3 is a side view of the apparatus according to the invention.

A butt-joining device 21 is disposed between the first conveyor 3 and the second conveyor 15 in such a manner that it extends in parallel with the front end 4a of the belt-shaped material 4. As shown in FIGS. 1 and 3, the butt-joining device 21 has vertical posts 22 on both sides of the conveyor frame 1. A beam 23 is provided between the posts 22 in such a manner that it is in parallel with the front end 4a of the belt-shaped material 4. A stand 24 extends over the beam 23. A plurality of guide rails 25 are provided on the upper surface of the stand 24 at equal intervals in the longitudinal direction of the stand 24. These guide rails 25 are perpendicular to the beam 23, i.e., to the front end 4a of the belt-shaped material 4. Guide members 26 located upstream and guide members 27 located downstream are slidably supported by the guide rails 25. Holders 28 and 29 are secured to these guide members 26 and 27, respectively. Rods 30 and 31 are secured to the outsides of the holders 28 and 29, respectively. The rods 30 and 31 penetrate the vertical plates 32 and 33, respectively, which is fixedly secured to the stand 24. Receiving members 34 and 35 are fixedly mounted on the parts of the rods 30 and 31 which are located outside of the plates 32 and 33, respectively. Springs 36 and 37 are provided between the receiving members 34 and 35 and the plates 32 and 33, respectively, so that the holders 28 and 29 are set apart from each other. Stoppers 38 and 39 are fixedly mounted on the parts of the rods 30 and 31 which are located inside of the plates 32 and 33, respectively, to determine the allowable distance between the holders 28 and 29. Guide plates 40 and 41 provided over the holders 28 and 29 support the belt-shaped material 4 from below.

As shown in FIGS. 4 and 5, a front end lower pawl 46 and a rear end lower pawl 47 are secured to the inner ends of the holders 28 and 29, respectively, in such a manner that the front end lower pawl 46 and the rear end lower pawl 47 extend respectively along the front end 4a and the rear end 4b of two pieces of the belt-shaped material 4. As shown in FIG. 5, there are a pair of front and rear end lower pawls 46 and 47 and associated structure. A plurality of front end protrusions 48 are formed in the inner surface of the front end lower pawl 46 which confronts with the rear end lower pawl 47, in such a manner that the protrusions 48 protrude towards the rear end lower pawl 47 and are arranged at equal intervals in the longitudinal direction of the front end lower pawl 46. On the other hand, a plurality of rear end protrusions 49 are formed in the inner surface of the rear end lower pawl 47 which confronts with the front end lower pawl 46 in such a manner that the rear end protrusions 49 protrude towards the front end lower pawl 46 and are also arranged at equal intervals in the longitudinal direction. In this connection, it should be noted that the front end protrusions 48 and the rear end protrusions 49 are equal in pitch, but are shifted by a half pitch from each other. Therefore, when the holders 28 and 29 are set close to each other, the front end protrusions 48 and the rear end protrusions 49 are interdigitated with each other in a plane, thus substantially forming no gaps therebetween.

An auxiliary member 50 is secured to the holder 28 located upstream of the front end lower pawl 46. The auxiliary member 50 has a cover plate 51 for covering the base of the front end protrusions 48 from above. Similarly, an auxiliary member 52 is secured to the holder 29 located downstream of the rear end lower pawl 47. The auxiliary member 52 has a cover plate 53 for covering the base of the rear end protrusions 49 from above.

A pair of vertical positioning pins 56 are provided between each pair of lower pawls 46 and 47. The lower end of each of the positioning pins 56 is connected to a lift member 57 which is coupled to a lifting means (not shown), as shown in FIGS. 1 and 3. Therefore, as the lift member 57 is moved vertically, the positioning pin 56 is caused to go in and out of the gap between the front end lower pawl 46 and the rear end lower pawl 47.

An upper beam 61 is in parallel with the above-described lower beam 23. A plurality of two-stage cylinders 62 are provided on the lower surface of the upper beam 61 in such a manner that they are positioned immediately above the holders 28 and 29. Each of the two-stage cylinders 62 is made up of an upper cylinder 63 and a lower cylinder 64. The piston rod 65 of the upper cylinder 63 is coupled to the aforementioned upper beam 61, while the piston rod 66 of the lower cylinder 64 is coupled to a lifting stand 67, a part of which penetrates a middle beam 69 which is disposed between the beams 23 and 61. The middle beam 69 has a plurality of guide members 70, which are slidably engaged with vertical rails 71 which are secured to the lifting stand 67. Each of the lifting stands 67 rotatably supports pairs of shafts 68 and 81 which are located immediately above the holders 28 and 29, respectively. The upper end portions of two pairs of parallel links 74 are coupled to the ends of the shafts 68. Similarly, the upper end portions of two pairs of parallel links 77 are coupled to the ends of the shafts 81. Holders 75 and 78 are provided immediately below the shafts 68 and 81, respectively. Regulating rods 76 and 79 are secured to the outer sides of these holders 75 and 78, respectively. The rods 76 and 79 thus secured are loosely fitted into holes formed in the vertical plates 72 and 82, respectively, which are fixedly secured to the lifting stands 67. The holder 75 rotatably supports a pair of shafts 73. Similarly, the holder 80 rotatably supports a pair of shafts 80. The ends of the shafts 73 and 80 are coupled to the lower end portions of the above-described parallel links 74 and 77 in such a manner that the parallel links are inclined.

Receiving members 85 and 86 are fixedly mounted on the parts of the regulating rods 76 and 79 which are located outside of the plates 72 and 82, respectively. Springs 87 and 88 with a large spring constant are interposed between the receiving members 85 and 86 and the plates 72 and 82 so as to move holders 75 and 78 away from each other. Stoppers 89 and 90 are mounted on the parts of the regulating rods 76 and 79 which are located inside of the plates 72 and 82, respectively, to determine the maximum distance between the holders 75 and 78.

As shown in FIG. 4, a front end upper pawl 91 and a rear end upper pawl 92 are secured to the inner ends of the holders 75 and 78 in such a manner that the upper pawls 91 and 92 are immediately above and in parallel with the front end lower pawl 46 and the rear end lower pawl 47, respectively. These upper pawls 91 and 92 are the same in construction as the lower pawls 46 and 47 and have front end protrusions 93 and rear end protrusions 94. Again as shown in FIG. 4, there are a pair of front and rear end upper pawls 91 and 92. In FIG. 4, an auxiliary member 95 has a cover plate 96 adapted to cover the base of the front end protrusions 93 from below and an auxiliary member 97 has a cover plate 98 adapted to cover the base of the rear end protrusions 94.

The front and rear end lower pawls 46 and 47 and the front and rear end upper pawls 91 and 92 are operated by a plurality of drive means comprising the two-stage cylinders 62 and the parallel links 74 and 77 as follows. First, the rear end lower and upper pawls 47 and 92 are caused to come close to each other to hold the rear end portion of a first belt-shaped material 4 therebetween, while the front end lower and upper pawls 46 and 91 are also caused to come close to each other to hold the front end portion of a second belt-shaped material 4 therebetween. Under this condition, the rear end lower and upper pawls 47 and 92, and the front end lower and upper pawls 46 and 91 are moved towards each other so that the rear end 4b of the first belt-shaped material 4 is abutted against the front end 4a of the second belt-shaped material 4.

As is apparent from the above description, each cylinder 62 utilizes the parallel links 74 and 77 to hold two belt-shaped materials 4 and to join them. Therefore, the apparatus for butt-joining the ends of belt-shaped materials according to the invention is advantageous in that it is simple in construction and low in manufacturing cost.

Now, the operation of the belt-shaped material butt-joining apparatus according to the invention will be described.

First, the first conveyor 3 is moved forwardly at low speed while the second conveyor 15 is moved backwardly at low speed, so that the belt-shaped material 4 which is placed on the first conveyor 3 so as to be joined to another belt-shaped material 4 (hereinafter referred to as "a first belt-shaped material 4", when applicable) and the belt-shaped material 4 which is provided on the second conveyor 15 and has been joined to the preceding one (hereinafter referred to as "a second belt-shaped material", when applicable) are moved towards the positioning pins 56 protruding upwardly. During this movement, the first and second belt-shaped materials 4 and 4, being attracted by the magnets 8 and 18, are brought into contact with the correcting belts 7 and 17, respectively, so that they are positioned correctly on the conveyors.

Figure 6A:
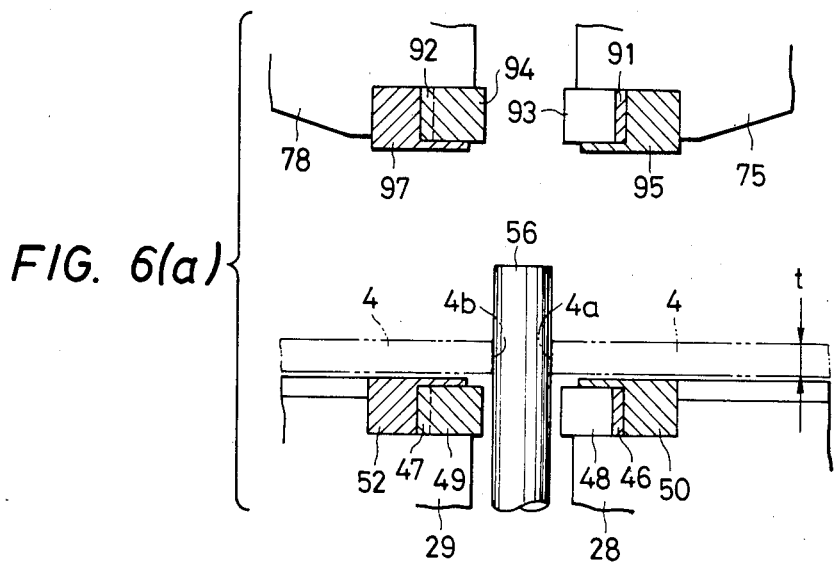

As the first conveyor 3 and the second conveyor 15 are run as described above, the front end 4a of the first belt-shaped material 4 on the first conveyor 3 and the rear end 4b of the second belt-shaped material 4 are abutted against the positioning pins 56 with a great force (for instance 2 to 3 kg in the case where the belt-shaped material 4 is 1.0 mm in thickness (t) an 150 mm in width (b) (cf. FIG. 2)) as shown in FIG. 6(a). Therefore, the front end 4a and the rear end 4b are made substantially parallel to each other. When the front end 4a and the rear end 4b have been made substantially parallel with each other as described above, the first and second conveyors 3 and 15 are stopped. At this time instant, the distance between the front and rear end lower pawls 46 and 47 is the maximum, and the front and rear end upper pawls 91 and 92 are held at the highest level and distance therebetween is the maximum.

Under this condition, the upper cylinders 63 of the two-stage cylinders 62 are operated to push out the piston rods 65, so that the plurality of lifting stands 67 are synchronously moved downwardly. As a result, the front end upper pawls 91 and the rear end upper pawls 92 are moved towards the front end lower pawls 46 and the rear end lower pawls 47, respectively. As a result, the front end portion of the first belt-shaped material 4 and the rear end portion of the second belt-shaped material 4 are clamped therebetween. When the front end upper pawls 91 and the rear end upper pawls 92 abut against the front end portion of the first belt-shaped material 4 and the rear end portion of the second belt-shaped material 4, respectively, the component of the force of abutment tends to rock the parallel links 74 and 77 thereby to cause the front end upper pawls 91 and the rear end upper pawls 92 to come close to each other. However, the movement of these pawls is prevented by the springs 87 and 88. That is, the front end upper pawls 91 and the rear end upper pawls 92 are not caused to come close to each other, and instead the front end portion of the first belt-shaped material 4 and the rear end portion of the second belt-shaped material 4 are slightly compressed and deformed. The front end portion and the rear end portion of these belt-shaped materials 4 are pushed with a great force from both sides as was described above. Therefore, even if the front end portion and the rear end portion have been deformed so as to be wavy in the direction of thickness, they are made completely flat and positively clamped.

Figure 6B:
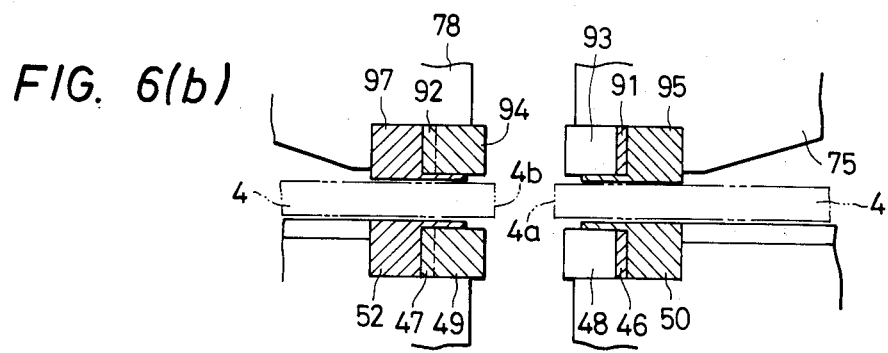

Under this condition, the lifting means is operated to move the positioning pins 56 downwardly together with the lift member 57 so that the front end 4a of the first belt-shaped material 4 is confronted with the rear end 4b of the second belt-shaped material 4 as shown in FIG. 6(b).

Thereafter, the more powerful lower cylinders 64 are operated so that the piston rods 66 are synchronously pushed out. As a result, the lifting stands 67 are moved downwardly, and the parallel links 74 and the parallel links 77 are swung respectively clockwise and counterclockwise, in FIG. 1, against the elastic forces of the springs 36, 37, 87 and 88. As a result, the front end lower pawls 46 and the front end upper pawls 91 which hold the front end portion of the first belt-shaped material 4, and the rear end lower pawls 47 and the rear end upper pawls 92 which hold the rear end portion of the second belt-shaped material 4 are moved towards each other until the front end 4a of the first belt-shaped material 4 and the rear end 4b of the second belt-shaped material 4 are abutted against each other. As a result, the front end 4a and the rear end 4b, being pushed against each other under high pressure, are joined together. In this operation, as shown in FIG. 6(c), the front end protrusions 48 and the rear end protrusions 49 are intertwined with each other in a plane, forming substantially no gaps therebetween. Similarly, the front end protrusions 93 and the rear end protrusions 94 are intertwined with each other in a plane, forming substantially no gaps therebetween. Therefore, the front end portion of the first belt-shaped material 4 and the rear end portion of the second belt-shaped material 4 are closely held by the protrusions 93 and 94 and the protrusions 48 and 49 from above and below. Accordingly, even if the front end portion and the rear end portion of the belt-shaped materials 4 are deformed as they are collapsed by the joining force, they cannot go upwardly nor downwardly. Therefore, the pressure for joining the front end 4a and the rear end 4b is increased, so that the front end 4a and the rear end 4b are positively joined together. Furthermore, even if the front end portion of the first belt-shaped material 4 or the rear end portion of the second belt-shaped material 4 remains wavy in the direction of thickness, the buckling deformation of that part is prevented during the butt-joining operation so that the front end 4a and the rear end 4b are positively joined together. In this case, the front end 4a of the first belt-shaped material 4 and the rear end 4b of the second belt-shaped material 4 are pushed against each other by the front and rear end lower pawls 46 and 47, and the front and rear end upper pawls 91 and 92 which are arranged along the front end 4a and the rear end 4b. Therefore, even if the front end 4a and the rear end 4b are not straight (that is, the distance therebetween is variable) the front end 4a and the rear end 4b are pushed towards each other according to the variable distance by these pawls, so that they are uniformly and positively joined together.

The piston rods 65 of the upper cylinders 63 are retracted to synchronously move the lifting stands 67 upwardly. As a result, the front end upper pawls 91 and the rear end upper pawls 92 are moved upwardly, thus moving away from the front end lower pawls 46 and the rear end lower pawls 47, while being moved away from each other by the elastic forces of the springs 87 and 88. Thus, the front end upper pawls 91 and the rear end upper pawls 92 are returned to the initial positions. Similarly, the front end lower pawls 46 and the rear end lower pawls 47 are returned to the initial positions by the elastic forces of the springs 36 and 37, while being moved away from each other. In this operation, friction produces a force which may break the joint of the front end 4a and the rear end 4b of the belt-shaped materials 4. However, since the front end 4a and the rear end 4b have been positively joined together as was described above, the joint of the front end 4a and the rear end 4b will never be broken.

Thereafter, as shown in FIG. 6(d), the positioning pins 56 are moved upwardly to lift the junction of the belt-shaped materials 4 so that the belt-shaped materials 4 are disengaged from the front end lower pawls 46 and the rear end lower pawls if necessary. Under this condition, the positioning pins 56 are moved downwardly, and the first conveyor 3, the correcting belt 7, the second conveyor 15 and the correcting belt 17 are operated to convey the belt-shaped materials 4. In this case, the movable frame 13 is moved as much as a predetermined distance along the rails 11 to the right in the direction of conveyance of the second conveyor 15, so as to set the amount of offset between the first and second conveyors 3 and 15 to zero. When, under this condition, the rear end 4b of the first belt-shaped material 4 has passed over the positioning pins 56, the operations of the first conveyor 3, the correcting belt 7, the second conveyor 15 and the correcting belt 17 are suspended. Next, the movable frame 13 is moved as much as the predetermined distance to the left in the direction of conveyance of the second conveyor, so as to set the first conveyor 3 apart form the second conveyor 15. This operation attributes to the fact that, during the joining operation, the rubbers for the front end portion and the rear end portion of the belt-shaped materials 4 are pulled perpendicularly towards the front end 4a and the rear end 4b. Next, the piston rods 66 of the lower cylinders 64 are retracted, and the positioning pins 56 are moved upwardly.

Thus, one cycle of operations of the apparatus has been accomplished. The above-described operations are repeatedly carried out to successively join the belt-shaped materials 4.

As was described above, according to the invention, even if the front end portion of a first belt-shaped material and/or the rear end portion of a second belt-shaped material remains deformed, that part is prevented from buckling deformation, and therefore the belt-shaped materials can be uniformly joined together.

What is claimed is:

1. An apparatus for joining the ends of belt-shaped materials comprising:
    a front end lower pawl and a rear end lower pawl which are extended respectively in a longitudinal direction along a front end of a first belt-shaped material and a rear end of a second belt-shaped material;
    a front end upper pawl and a rear end upper pawl which are provided immediately above and in parallel with said front end lower pawl and said rear end lower pawl, respectively; and
    drive means for moving said front end lower pawl and said front end upper pawl towards each other to hold the front end portion of said first belt-shaped material therebetween and moving said rear end power pawl and said rear end upper pawl towards each other to hold the rear end portion of said second belt-shaped material therebetween, and moving said rear end lower and upper pawls and said front end lower and upper pawls towards each other so that the front end of said first belt-shaped material and the rear end of said second belt-shaped material are butt-joined; wherein said rear end lower pawl and said rear end upper pawl have rear end lower protrusions and rear end upper protrusions, respectively; which are arranged at intervals in said longitudinal direction and protrude towards said front end lower pawl and said front end upper pawl, respectively, and
    said front end lower pawl and said front end upper pawl have front end lower protrusions and front end upper protrusions, respectively, which are arranged at intervals in said longitudinal direction and protrude towards said rear end lower pawl and said rear end upper pawl, respectively, said front end protrusions being intertwined with said rear end protrusions when said rear end lower pawl and rear end upper pawl and said front end lower pawl and front end upper pawl are moved towards each other; and
    said front and rear upper protrusions have a front and rear cover surface, respectively, for partially covering a base of a lower surface thereof and said front and rear lower protrusions have a front and rear cover surface, respectively, for partially covering a base of an upper surface thereof whereby said front and rear cover surfaces are substantially abutting when said front end protrusions are intertwined with said rear end protrusions.

2. An apparatus as recited in claim 1, wherein said drive means comprises:
    a vertical drive mechanism;
    a first link mechanism and a second link mechanism supported by said vertical drive mechanism respectively holding said front end upper pawl and said rear end upper pawl, said first and second link mechanisms moving toward each other when said vertical drive mechanism presses said front end upper pawl against said front end lower pawl and presses said rear end upper pawl against said rear end lower pawl.

3. An apparatus as recited in claim 2, further comprising biasing means to bias said link mechanisms away from each other and wherein said vertical drive mechanism comprises a first stage drive having force insufficient to overcome said biasing means and a second stage drive having force sufficient to overcome said biasing means.

4. An apparatus as recited in claim 1, further comprising a stopper pin selectively insertable between said front end lower pawl and said rear end lower pawl.

* * * * *